(12) United States Patent
Yoshikawa et al.

(10) Patent No.: US 8,359,457 B2
(45) Date of Patent: Jan. 22, 2013

(54) SEMICONDUCTOR DEVICE AND DATA PROCESSING METHOD PERFORMED BY SEMICONDUCTOR DEVICE TO PERFORM A REPEAT OPERATION WITHIN A RECONFIGURABLE PIPELINE

(75) Inventors: Takashi Yoshikawa, Kanagawa (JP); Shigehiro Asano, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 313 days.

(21) Appl. No.: 12/372,011

(22) Filed: Feb. 17, 2009

(65) Prior Publication Data
US 2009/0327655 A1 Dec. 31, 2009

(30) Foreign Application Priority Data

Jun. 25, 2008 (JP) ................................. 2008-166511

(51) Int. Cl.
*G06F 15/00* (2006.01)
*G06F 15/76* (2006.01)
(52) U.S. Cl. ......................................... 712/15; 712/220
(58) Field of Classification Search ...................... 712/15
See application file for complete search history.

(56) References Cited

U.S. PATENT DOCUMENTS

2007/0143577 A1* 6/2007 Smith ............................ 712/10
2007/0245131 A1 10/2007 Yoshikawa et al.

FOREIGN PATENT DOCUMENTS

JP 2007-257549 10/2007

OTHER PUBLICATIONS

Sueyoshi et al, Reconfigurable System, pp. 189-208, Aug. 2005.
Goldstein et al, PipeRench: A Reconfigurable Architecture and Compiler, IEEE Computer vol. 33, Issue 4, pp. 70-77, Apr. 2000.

* cited by examiner

*Primary Examiner* — Eddie P Chan
*Assistant Examiner* — George Giroux
(74) *Attorney, Agent, or Firm* — Turocy & Watson, LLP (57) ABSTRACT

The semiconductor device includes a controller and a plurality of dynamically reconfigurable circuits connected to one another in series below the controller to perform operations in the manner of a pipeline. The controller inputs data and reconfiguration information to the first one of the dynamically reconfigurable circuits. Each of the dynamically reconfigurable circuits includes a processing unit that performs a data computation, an updating unit that updates the reconfiguration information, and a repetition controlling unit that determines whether to repeat the computation and controls the data and the reconfiguration information.

9 Claims, 9 Drawing Sheets

| INPUT ADDRESS | OUTPUT ADDRESS | CIRCUIT INFORMATION IDENTIFIER | RECONFIGU- RATION RULE | VALID FLAG | END FLAG |
|---|---|---|---|---|---|
| 0 | 100 | 0 | 12E_2 | 1 | 0 |
| 1 | 200 | 10 | 12D_2 | 1 | 0 |
| 2 | 300 | 20 | 12C_2 | 1 | 0 |
| 3 | 400 | 30 | 12B_2 | 1 | 0 |
| 4 | 500 | 40 | 12A_2 | 1 | 1 |

COMBINATION OF TAG IDENTIFYING COMPUTING UNIT 12 (REPRESENTED BY CODE) AND NUMBER OF TIMES OF RECONFIGURATION REPRESENTED AS CODE_NUMBER OF TIMES

1: VALID

0: NOT END
1: END

SEMICONDUCTOR DEVICE AND DATA PROCESSING METHOD PERFORMED BY SEMICONDUCTOR DEVICE TO PERFORM A REPEAT OPERATION WITHIN A RECONFIGURABLE PIPELINE

CROSS-REFERENCE TO RELATED APPLICATIONS

This application is based upon and claims the benefit of priority from the prior Japanese Patent Application No. 2008-166511, filed on Jun. 25, 2008; the entire contents of which are incorporated herein by reference.

BACKGROUND OF THE INVENTION

1. Field of the Invention

The present invention relates to a semiconductor device that incorporates a dynamically reconfigurable circuit technology, and also to a method of processing data by such a semiconductor device.

2. Description of the Related Art

The recent trend of small-dimension low-power-consumption devices such as cellular phones has been toward more complicated and diversified functions, and high performance has been demanded for such devices. To achieve both high-performance and small-dimension low-power-consumption features, the hardware needs to be specially developed and manufactured. As the complication and diversification of the functions proceeds, however, the costs of developing and manufacturing such hardware are increasing every year. As an option to reduce the development and manufacturing costs, a semiconductor device incorporating the dynamically reconfigurable circuit technology has been receiving attention.

A semiconductor device using the dynamically reconfigurable circuit technology includes reconfigurable circuits, such as FPGAs, and a memory device that stores therein various items of circuit information necessary to construct different circuits (hereinafter, "execution circuits") that are to be executed by the circuit reconfigurable circuits. The semiconductor device of this type reads necessary circuit information and constructs an execution circuit under operating conditions, in accordance with rules predetermined by a software program or the like. Such a device is different from a conventional semiconductor device with a FPGA in that execution circuits can be changed during the operation.

With the semiconductor device using the dynamically reconfigurable circuit technology, the cost of developing the specially designed hardware can be reduced in the same level as the FPGA. Furthermore, the cost of manufacturing the specially designed hardware can also be reduced because various functions can be realized on a small semiconductor device by dynamically constructing execution circuits.

Examples of semiconductor devices using the dynamically reconfigurable circuit technology include a Dynamically Reconfigurable Processor (DRP, see "Reconfigurable System", Ohmsha, pp. 189-208) offered by NEC Electronics and a device described in JP-A 2007-257549 (KOKAI).

The DRP offered by NEC Electronics is configured in such that processing elements (PEs), which are fundamental computing elements, are aligned in two-dimensional array, with a state transition controller positioned at the center thereof. A PE is a computing device that constitutes an execution circuit and stores different items of circuit information regarding types of computation and connections with other PEs in an instruction memory provided inside the PE. Each of the PEs reads the circuit information from the instruction memory in accordance with an instruction pointer given by the state transition controller, and dynamically constitutes an execution circuit.

According to JP-A 2007-257549 (KOKAI), a controller that controls the changes of the configuration and computing units that perform computations are connected to one another in the form of a pipeline. A reconfiguration rule is supplied from the controller to change the execution circuit, with one of the computing units receiving the rule first and the rest of the units successively receiving the rule one cycle after the previous unit of each unit. Then, each of the computing units reads the circuit information from its inner memory in accordance with the reconfiguration rule received in the corresponding cycle, and dynamically constitutes an execution circuit.

To achieve a high-performance semiconductor device incorporating the dynamically reconfigurable circuit technology, it is necessary to reduce the non-computing time and thereby maximize the amount of computation performed at the computing elements within a limited period of time.

In a DRP, however, an instruction pointer is supplied from the state transition controller to all the PEs at the same time, in accordance with which each of the PEs starts constituting an execution circuit at the time. Thus, when some of the PEs have completed the computation but some others have not, the execution circuit of any PE in the computing process should not be changed, and therefore none of the execution circuits of the PEs is allowed to change. As a result, the period of non-computing time becomes longer.

According to JP-A 2007-257549 (KOKAI), the reconfiguration rule supplied by the controller sequentially reaches the computing units with a one-cycle lag between the units, and each of the computing units constitutes an execution circuit in accordance with the reconfiguration rule received in the corresponding cycle. Thus, even if the controller supplies a reconfiguration rule to an upper one of the pipeline-connected computing units to change an execution circuit before the lower computing units finish the computations, accurate computation results can be obtained as long as the lower units finish the computations before the reconfiguration rule reaches these units. Hence, the non-computing time becomes shorter than in the DRP.

According to the description of JP-A 2007-257549 (KOKAI), however, the reconfiguration rule is always transferred from the topmost controller of the pipeline to the lower computing units, one in a cycle. This means that, when the number of computations that are to be performed on data is larger than the number of stages of computing units, midstream results output by the lowermost computing unit needs to be input to the uppermost computing unit to newly perform the computations in sequence from the uppermost computing unit down. If the number of computations re-starting from the uppermost computing unit is smaller than the number of computing units, a non-computing time is generated at the lower computing units.

SUMMARY OF THE INVENTION

According to one aspect of the present invention, a semiconductor device includes a controller; and a plurality of dynamically reconfigurable circuits connected to one another in series below the controller to perform operations in a manner of a pipeline, wherein (A) the controller inputs to a first one of the dynamically reconfigurable circuits data that is to be processed, and reconfiguration information including identification information that identifies an item of circuit information used to constitute an execution circuit necessary for a computation executed on the data in the dynamically reconfigurable circuits, from among a plural items of circuit information held individually by the dynamically reconfigurable circuits, and information that indicates number of times of the computation that is executed individually by the dynamically reconfigurable circuits, and (B) each of the dynamically reconfigurable circuits includes (a) a processing unit that is constituted by an execution circuit changed in accordance with the circuit information identified by the reconfiguration information, and processes the data input by the controller or by a previous one of the dynamically reconfigurable circuits, (b) an updating unit that updates identification information included in the reconfiguration information input from the controller or the previous one of the dynamically reconfigurable circuits to identification information that identifies the circuit information necessary for a computation that is to be subsequently executed on the processed data, and (c) a repetition controlling unit that determines whether the processing unit is to repeat the computation, performs a control so that the processed data and the reconfiguration information that is updated are input to a subsequent one of the dynamically reconfigurable circuits when the repetition controlling unit determines that the processing unit has completed the computation for the number of times, and performs a control so that the processed data and the reconfiguration information that is updated are input to the same one of the dynamically reconfigurable circuits when the repetition controlling unit determines that the processing unit has not yet completed the computation for the number of times.

According to another aspect of the present invention, a data processing method performed by a semiconductor device that includes a controller and a plurality of dynamically reconfigurable circuits connected to one another in series below the controller to perform operations in a manner of a pipeline, the method includes inputting, by the controller to a first one of the dynamically reconfigurable circuits, data that is to be processed, and reconfiguration information including identification information that identifies an item of circuit information used to constitute an execution circuit necessary for a computation executed on the data in the dynamically reconfigurable circuits, and information that indicates number of times of the computation that is executed individually by the dynamically reconfigurable circuits; processing, by each of the dynamically reconfigurable circuits, the data that is constituted by an execution circuit changed in accordance with the circuit information identified by the reconfiguration information, and input by the controller or by a previous one of the dynamically reconfigurable circuits; updating, by each of the dynamically reconfigurable circuits, identification information included in the reconfiguration information input from the controller or the previous one of the dynamically reconfigurable circuits to identification information that identifies the circuit information necessary for a computation that is to be subsequently executed on the processed data; and determining, by each of the dynamically reconfigurable circuits, whether the processing is to repeat the computation, performing a control so that the processed data and the reconfiguration information that is updated are input to a subsequent one of the dynamically reconfigurable circuits when the controlling determines that the processing has completed the computation for the number of times, and performing a control so that the processed data and the reconfiguration information that is updated are input to the same one of the dynamically reconfigurable circuits when the controlling determines that the processing has not yet completed the computation for the number of times.

DETAILED DESCRIPTION OF THE INVENTION

Exemplary embodiments of a semiconductor device and a data processing method incorporated by this semiconductor device are explained in detail below with reference to the attached drawings. It should be noted that the present invention is not limited by these embodiments.

Figure 1:
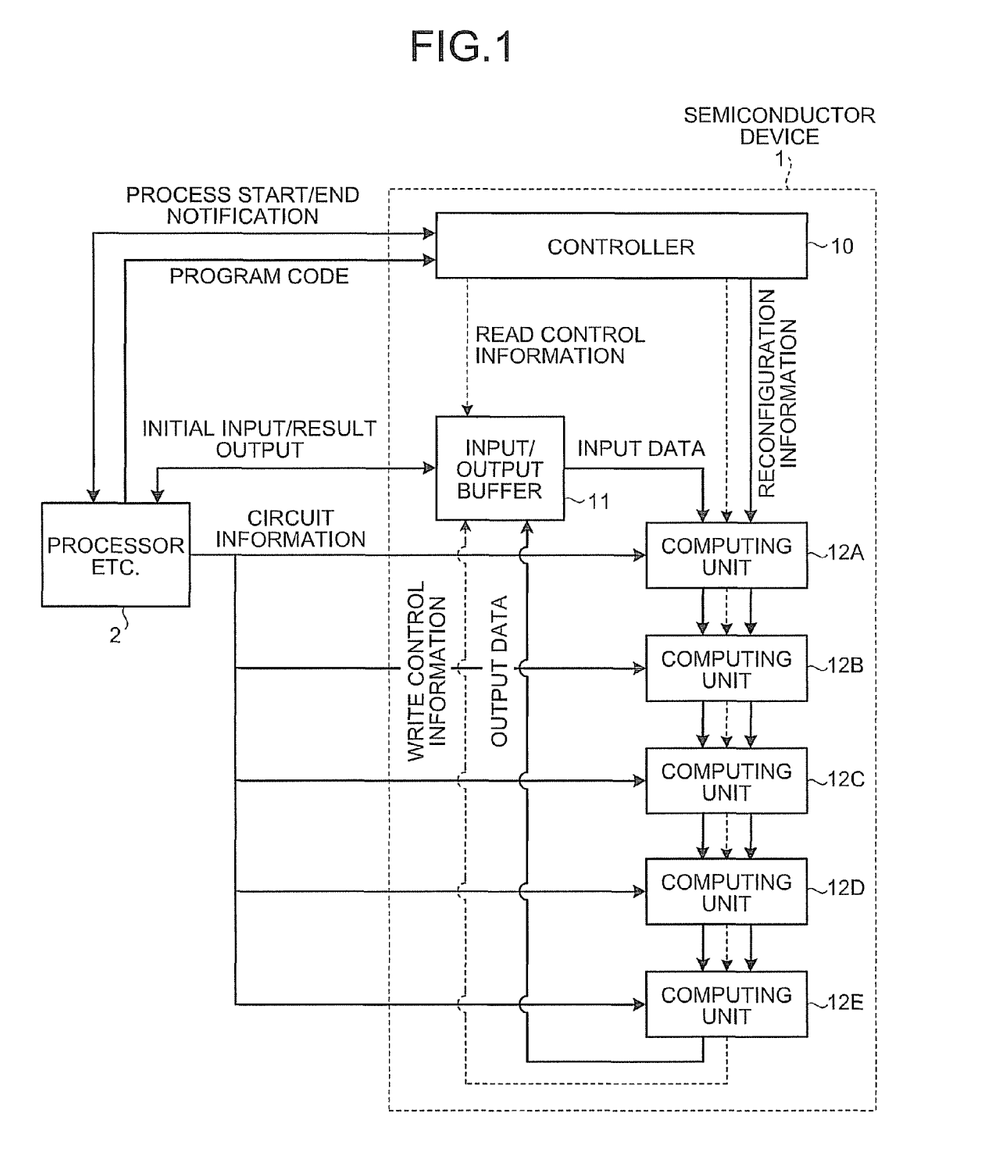
FIG. 1 is a block diagram for showing the structure of a semiconductor device according to an embodiment of the present invention.
Figure 2:
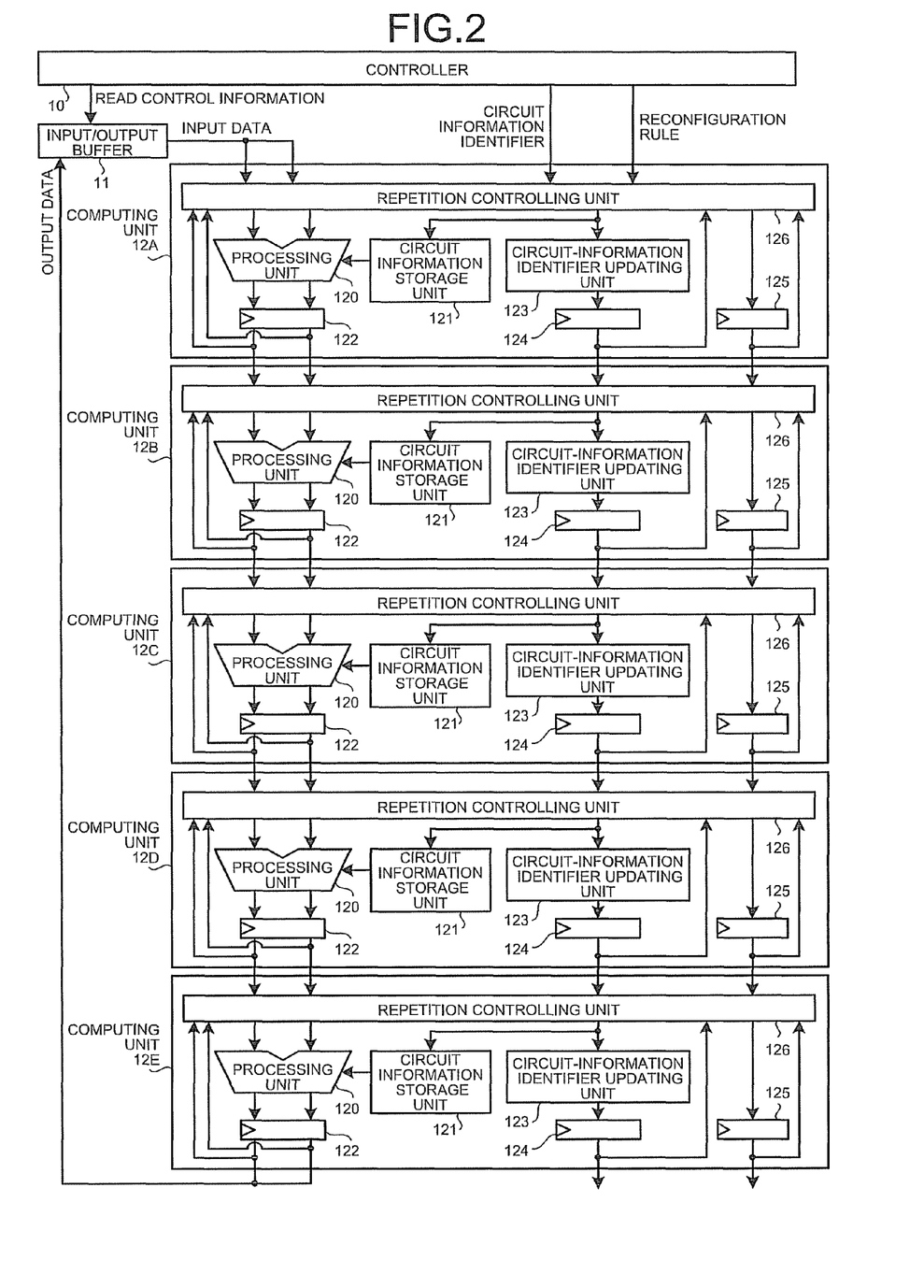
FIG. 2 is a block diagram for showing the structure of computing units.

As illustrated in FIGS. 1 and 2, a semiconductor device 1 performs data processing in response to an instruction sent from an external device 2 such as a processor, and includes a controller 10, an input/output buffer 11, and five computing units 12A to 12E. The data processing here means a series of computations that are individually conducted.

The controller 10 is connected to the input/output buffer 11 and the computing unit 12A. The controller 10 outputs to the computing unit 12A reconfiguration information that instructs the reconfiguration of the computing units 12A to 12E in each cycle and control information that is used to control the operation of writing data into the input/output buffer 11 (write control information) in accordance with a code stored in a program code memory 10C, which will be described later. A cycle refers to a minimum unit of time period between the first time when the value of a memory element changes in a synchronous circuit and the next time when the value of the memory element changes. According to the present embodiment, the reconfiguration information includes a circuit information identifier that indicates a position of a circuit information storage unit 121 at which the circuit information necessary for each cycle of the data processing is stored, and a reconfiguration rule that indicates the number of times that the reconfiguration is performed by the computing units 12A to 12E.

The controller 10 further outputs control information that is used to control the operation of reading data (read control information) from the input/output buffer 11 to the computing unit 12A to the input/output buffer 11, in accordance with the code stored in the program code memory 10C. The structure of the controller 10 will be discussed in detail later, together with the data processing of the controller 10.

The input/output buffer 11 is connected to the controller 10 and the computing units 12A and 12E. The input/output buffer 11 temporarily stores therein the data that is supplied to the computing unit 12A when the semiconductor device 1 starts the data processing and the midstream or final result of the data processing obtained by the computing unit 12E of the semiconductor device 1. The external device 2 writes initial input data into the input/output buffer 11 before the data processing begins. Furthermore, the computing unit 12A of the semiconductor device 1 may continue the data processing by using, as input data, the midstream result of the data processing that is held in the input/output buffer 11. The final result held in the input/output buffer 11 is read out by the external device 2.

The computing units 12A to 12E implement the data processing. The computing units 12A to 12E are connected to one another in series, or in other words in the form of a pipeline, below the controller, and are each provided with a processing unit that can constitute an execution circuit to individually execute a computation. Each of the computing units 12A to 12E has a function of processing the input data and outputs the result by constituting an execution circuit on the processing unit, based on the input reconfiguration information (i.e., by changing the circuit structure of the processing unit). The computing units 12A to 12E also update and output the reconfiguration information in accordance with a predetermined rule. In other words, the computing units 12A to 12E form dynamically reconfigurable circuits. The present embodiment adopts five computing units, but the invention is not limited thereto. The number of computing units may be varied in accordance with the capacity required for the semiconductor device 1.

The information that identifies the execution circuit constituted by the processing unit is referred to as circuit information. For the circuit information, various types of information can be adopted, such as a table showing the relationship between the data input to the processing units and the data output from the processing units and a value of a setup signal that determines the type of computation performed by the processing units. The computing units 12A to 12E determine the circuit information that identifies the execution circuit that is to be constituted in their processing units, based on the reconfiguration information, and thereby constitute the execution circuit (or change the circuit structure).

The computing unit 12A is connected to the controller 10, and receives the reconfiguration information output by the controller 10 and the input data read from the input/output buffer 11. The computing units 12B to 12E are connected to the preceding computing units 12A to 12D, respectively. The computing units 12B to 12E receive the reconfiguration information and the computation result data output by the preceding computing units 12A to 12D, and perform the same processing as the computing unit 12A. The output of the computing unit 12E is connected to the input/output buffer 11 so that the data output by the computing unit 12E as a result of the computation is stored in the input/output buffer 11 in accordance with the control information (write control information) transferred by the controller 10 in the same manner as the reconfiguration information.

As described above, the controller 10 and the computing units 12A to 12E are connected in the form of a pipeline, and therefore the computation is performed in the pipelined manner onto the data read from the input/output buffer 11. Depending on the rule indicated by the reconfiguration information, the computing units 12A to 12E may adopt, in place of the data and the reconfiguration information input from the preceding unit of the pipeline, the computation result (data) output by the computing units of themselves in the previous cycle and the updated reconfiguration information in some cycles of the computation. The structure of the computing unit 12 will be described in detail later together with the data processing of the computing unit 12.

The outline of the data processing from beginning to end performed by the semiconductor device 1 according to the present embodiment is explained below.

The controller 10 interprets codes stored in the program code memory 10C, which will be described later, in each cycle, based on which the reconfiguration information and the write control information are output to the computing units 12 (the computing unit 12A, to be more specific). The reconfiguration information includes the circuit information identifier that indicates the position in the circuit information storage unit 121 at which the circuit information necessary for the data processing for each cycle is stored and the reconfiguration rule that indicates the number of times the computing units 12A to 12E perform the reconfiguration.

The input/output buffer 11 reads data from the input/output buffer 11 and sends it to the computing unit 12A every time it receives a data read request (read control information) from the controller 10. Furthermore, every time of it receives from the computing unit 12E a data write request (write control information) transferred from the controller 10 by way of the computing units 12A to 12E in a pipelined manner, the input/output buffer 11 writes the computation result (output data) output by the computing unit 12E into the input/output buffer 11 in accordance with the received information.

The computing units 12A to 12E read the circuit information from the circuit information storage unit 121 based on the circuit information identifier that is input in every cycle, and process the input data to output the result by constituting the execution circuit in the processing unit in accordance with the circuit information. Furthermore, the computing units 12A to 12E update and output the circuit information identifier in accordance with a predetermined rule. The circuit information is transferred to the circuit information storage unit 121 by the external device 2 before the data processing begins.

More specifically, the computing unit 12A performs a computation on the data input from the input/output buffer 11 in accordance with the circuit information identifier input from the controller 10, and updates the circuit information identifier in accordance with the rule. If the reconfiguration rule indicates that the reconfiguration should be executed for more than once, the computing unit 12A repeats the computation by using the computation result (data) obtained by the computing unit 12A itself in the previous cycle and the circuit information identifier updated in the previous cycle, between the cycle after the one in which the reconfiguration rule is received and the cycle in which the reconfiguration has finished being performed for the requested number of times.

Furthermore, the computing units 12B to 12E use, as input data, the reconfiguration information updated by and received from the preceding computing units 12A to 12D and the computation result (data) to perform a computation in the same manner as the computing unit 12A. If the reconfiguration rule indicates that the reconfiguration should be performed for more than once, the computing units 12B to 12E repeat the computation by using the computation result (data) obtained by the computing units 12B to 12E themselves in the previous cycle and the circuit information identifier updated in the previous cycle between the cycle after the one in which the reconfiguration rule is received and the cycle in which the reconfiguration has finished being performed for the requested number of times. The computation result obtained by the computing unit 12E is written into the input/output buffer 11 in accordance with the write control information that is sent from the controller 10 together with the reconfiguration information.

When the controller 10 finishes interpreting all the codes, the controller 10 notifies the external device, such as the processor, of the completion of the data processing and terminates the processing.

Finally, the external device 2 reads the computation result of the semiconductor device 1 from the input/output buffer 11 a predetermined number of cycles after the process completion notification is received. The predetermined number of cycles is the total of the number of times the computing units 12 performs the computation and the number of cycles required for writing data into the input/output buffer 11.

The data processing performed by the computing units 12 is now explained with reference to FIG. 2. Each of the computing units 12A to 12E includes a processing unit 120, the circuit information storage unit 121, a data register 122, a circuit-information identifier updating unit 123, a circuit information identifier register 124, a reconfiguration rule register 125, and a repetition controlling unit 126. The write control information is omitted from FIG. 2.

The processing unit 120 constructs execution circuits of hardware that perform individual computations. The processing unit 120 processes the input data and writes it in the data register 122 by constructing an execution circuit in accordance with the circuit information read from the circuit information storage unit 121 (or in other words, by changing the circuitry structure). The processing unit 120 is connected to the circuit information storage unit 121, the data output of the repetition controlling unit 126, and the data register 122.

Figure 3:
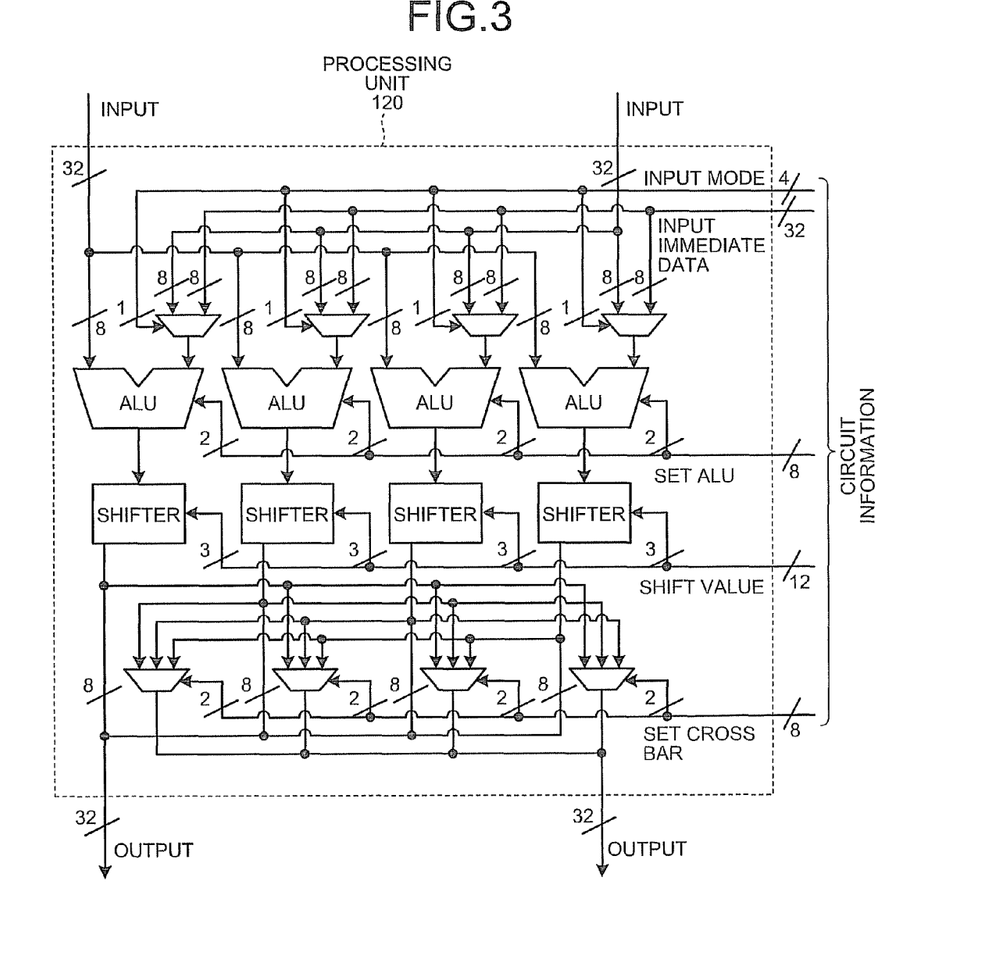
FIG. 3 is a diagram for showing an example of a processing unit.

As illustrated in FIG. 3, the processing unit 120 includes four 8-bit arithmetic logic units (ALUs) and four shifters. An execution circuit is constructed in such a manner that, when two 32-bit data items are input, different computations can be executed for every 8 bits. This computation result becomes one of the 32-bit outputs. The processing unit 120 further includes cross bars so that the result of changing the arranging order of four 8-bit outputs from the shifters becomes one of the 32-bit outputs.

The circuit information consists of 16 bits in total, for a 8-bit calculation, including 1 bit for an input mode to determine whether one of the ALU inputs can be used as immediate data, 8 bits for the immediate data, 2 bits for ALU setting, 3 bits for a shift value, and 2 bits for cross bar setting. The entire circuit information of the processing unit 120 consists of 64 bits.

The circuit information storage unit 121 stores therein the circuit information, and is connected to the circuit information identifier output of the repetition controlling unit 126 and to the processing unit 120. The circuit information is read from the circuit information storage unit 121 in each cycle by using a circuit information identifier output by the repetition controlling unit 126 as an address, and the information is input to the processing unit 120. In this example, the circuit information storage unit 121 is arranged in each of the computing units 12A to 12E. However, five circuit information storage units 121 may be arranged outside the computing units 12A to 12E in such a manner as to individually correspond to the computing units 12A to 12E and connected to the corresponding computing units 12A to 12E. Alternatively, a single circuit information storage unit 121 may be provided outside the computing units 12A to 12E to be shared by the computing units 12A to 12E and connected to the computing units 12A to 12E.

The data register 122 temporarily stores therein the computation result (data) obtained by the processing unit 120. The data register 122 is connected to the data output of the processing unit 120, the repetition controlling unit 126 of its own computing unit, and the repetition controlling unit 126 of the subsequent computing unit 12.

The circuit-information identifier updating unit 123 receives the circuit information identifier from the repetition controlling unit 126 as input data, updates the input circuit information identifier in accordance with a predetermined rule, and outputs the updated identifier. This rule should be defined in such a manner that different circuit information identifiers are assigned to identify different items of the circuit information that are used to constitute execution circuits necessary for the processing in a series of computations in which the data input by the input/output buffer 11 is processed through the computing units 12A to 12E and sent back into the input/output buffer 11. In this example, the circuit-information identifier updating unit 123 outputs a value obtained by incrementing the value of the input circuit information identifier by one as an updated circuit information identifier. The circuit-information identifier updating unit 123 is connected to the circuit information identifier output of the repetition controlling unit 126 and also to the circuit information identifier register 124.

The circuit information identifier register 124 temporarily stores therein the circuit information identifier updated by the circuit-information identifier updating unit 123. The circuit information identifier register 124 is connected to the output of the circuit-information identifier updating unit 123, the repetition controlling unit 126 of its own computing unit, and the repetition controlling unit 126 of the subsequent computing unit 12.

The reconfiguration rule register 125 temporarily stores therein the reconfiguration rule output by the repetition controlling unit 126. The reconfiguration rule register 125 is connected to the reconfiguration rule output of the repetition controlling unit 126, the repetition controlling unit 126 of its own computing unit, and the repetition controlling unit 126 of the subsequent computing unit 12.

The repetition controlling unit 126 determines whether the corresponding computing unit 12 repeats the computation. For example, the repetition controlling unit 126 controls the operation in such a manner that, when the reconfiguration rule input to the computing unit 12 indicates that the computation is performed twice or more, the first computation is performed based on the data input by the input/output buffer 11 or the preceding one of the computing units 12A to 12D and the circuit information identifier input by the controller 10 or the preceding one of the computing units 12A to 12D. The subsequent computations are controlled in such a manner that the result (data) obtained by the computing units 12A to 12E themselves in the previous cycle and the circuit information identifier updated by the circuit-information identifier updating unit 123 of their own are used.

More specifically, in the first computation, the repetition controlling unit 126 of the computing unit 12A receives the data output by the input/output buffer 11 and the reconfiguration information (the circuit information identifier and the reconfiguration rule) output by the controller 10, and outputs the data to the processing unit 120, the circuit information storage unit 121, the circuit-information identifier updating unit 123, and the reconfiguration rule register 125. In the second computation, the repetition controlling unit 126 of the computing unit 12A receives the data output by the data register 122 of the same computing unit, the circuit information identifier output by the circuit information identifier register 124 of the same computing unit, and the reconfiguration rule output by the reconfiguration rule register 125 of the same unit, and outputs the data again to the processing unit 120, the circuit information storage unit 121, the circuit-information identifier updating unit 123, and the reconfiguration rule register 125 of the same computing unit.

In a similar manner, the repetition controlling unit 126 of any of the computing units 12B to 12E receives, in the first computation, the data output by the data register 122 of the preceding computing unit 12, the circuit information identifier output by the circuit information identifier register 124 of the preceding computing unit 12, and the reconfiguration rule output by the reconfiguration rule register 125 of the preceding computing unit 12. The repetition controlling unit 126 outputs the data to the processing unit 120, the circuit information storage unit 121, the circuit-information identifier updating unit 123, and the reconfiguration rule register 125 of its own computing unit 12. In the second computation, the repetition controlling unit 126 of any of the computing units 12B to 12E receives the data, the circuit information identifier, and the reconfiguration rule output by the data register 122, the circuit information identifier register 124, and the reconfiguration rule register 125, respectively, of its own computing unit 12. Then, the repetition controlling unit 126 outputs the data again to the processing unit 120, the circuit information storage unit 121, the circuit-information identifier updating unit 123, and the reconfiguration rule register 125 of its own computing unit 12.

The repetition controlling unit 126 does not perform a repeat control when the number of times indicated by the reconfiguration rule that is input to the computing unit 12 is once or when the computation is finished for the designated number of times. Thus, the computing unit 12 outputs to the subsequent computing unit 12 (the repetition controlling unit 126 thereof) the data, the circuit information identifier, and the reconfiguration rule output by the data register 122, the circuit information identifier register 124, and the reconfiguration rule register 125 of the same computing unit 12 after the first computation or any designated number of times of computation are completed. In the same manner, the write control information transferred from the controller 10 is held in the computing unit 12 during the repeat control, and is output to the subsequent computing unit 12 after the repeat control.

Figure 4:
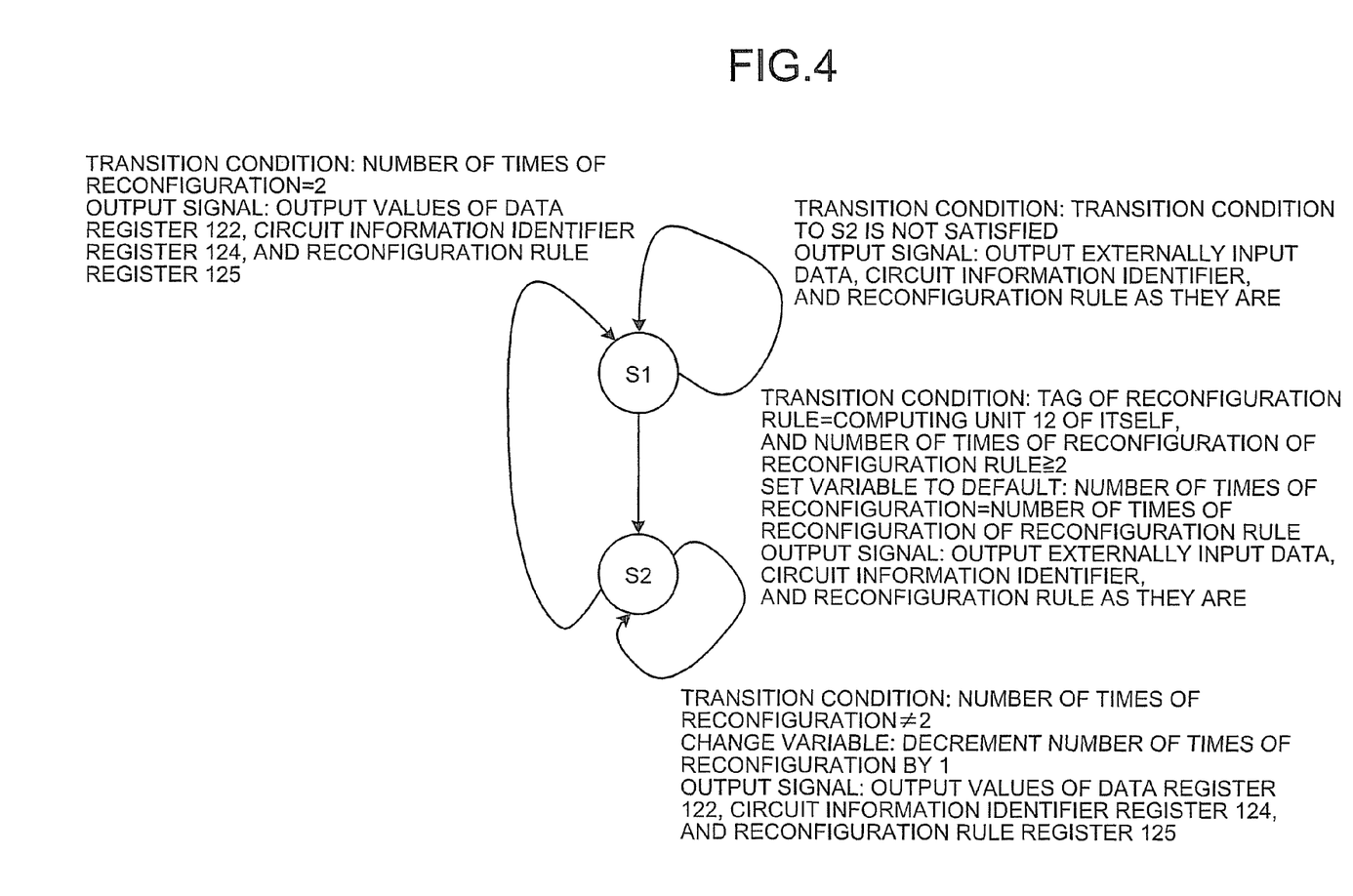
FIG. 4 is a state transition diagram for an exemplary operation of a repetition controlling unit.

In FIG. 4, the reconfiguration rule is expressed by a combination of a tag that identifies one of the computing units 12A to 12E and the number of times the reconfiguration is performed.

In the initial state S1, the repetition controlling unit 126 shifts to a state S2 when the tag of the reconfiguration rule indicates its own computing unit 12 and also when the reconfiguration rule indicates the reconfiguration should be performed twice or more. Otherwise, the repetition controlling unit 126 shifts to the initial state S1. In either state, the repetition controlling unit 126 sets the number of times of the reconfiguration to the inner memory (not shown), and outputs the data, the circuit information identifier, and the reconfiguration rule (the number of times of the reconfiguration and the tag) output from the outside of its own computing unit 12, without any change.

In the state S2, the repetition controlling unit 126 shifts to the initial state S1 if the number of times of the reconfiguration set to the inner memory (not shown) is "2". If not, the repetition controlling unit 126 decrements the number of times of the reconfiguration set to the inner memory (not shown) by 1, and shifts to the state S2. In either state, the repetition controlling unit 126 again outputs the data, the circuit information identifier, and the reconfiguration rule held in the data register 122, the circuit information identifier register 124, and the reconfiguration rule register 125, respectively, of the same computing unit 12.

Figure 5:
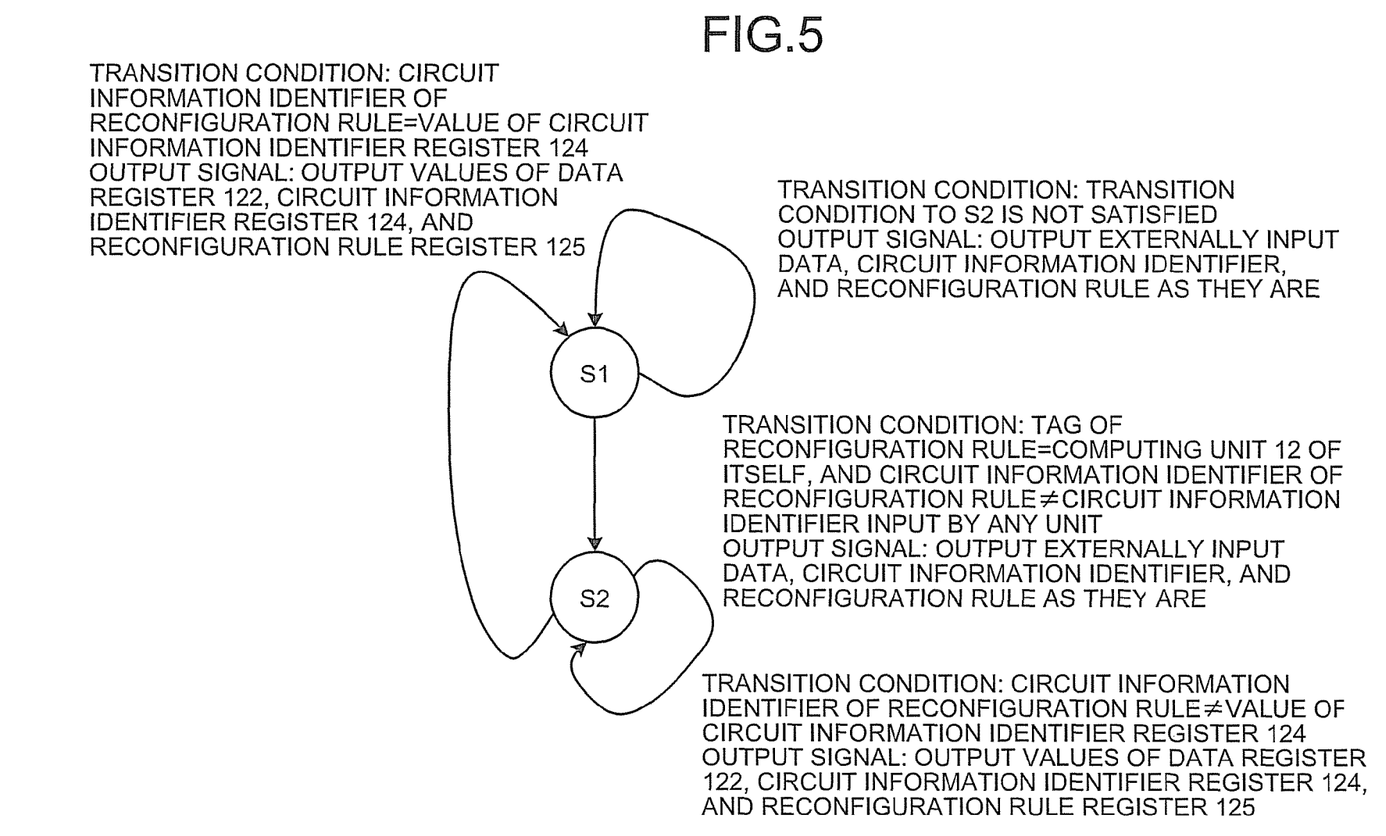
FIG. 5 is a state transition diagram for another exemplary operation of the repetition controlling unit.

In FIG. 5, the reconfiguration rule is expressed by a combination of a tag that identifies one of the computing units 12A to 12E and a circuit information identifier that identifies an item of the circuit information that is used in a computation executed by the computing unit designated by the tag in the last reconfiguration.

In this example, the outputs from the repetition controlling unit 126 in the initial state S1 and the state S2 are the same as in FIG. 4. The shift from the initial state S1 to the state S2 occurs when the tag of the reconfiguration rule indicates the computing unit 12 of its own, and when the circuit information identifier of the reconfiguration rule is different from the circuit information identifier that is externally input to the computing unit 12 of its own. In the transition from the initial state S1 to the state S2 or the transition from the state S2 again to the state S2, the value of the circuit information identifier of the circuit information identifier register 124 is incremented by 1. The transition from the state S2 to the initial state S1 occurs when the circuit information identifier input from the circuit information identifier register 124 of the same computing unit 12 agrees with the circuit information identifier of the reconfiguration rule.

Figure 6:
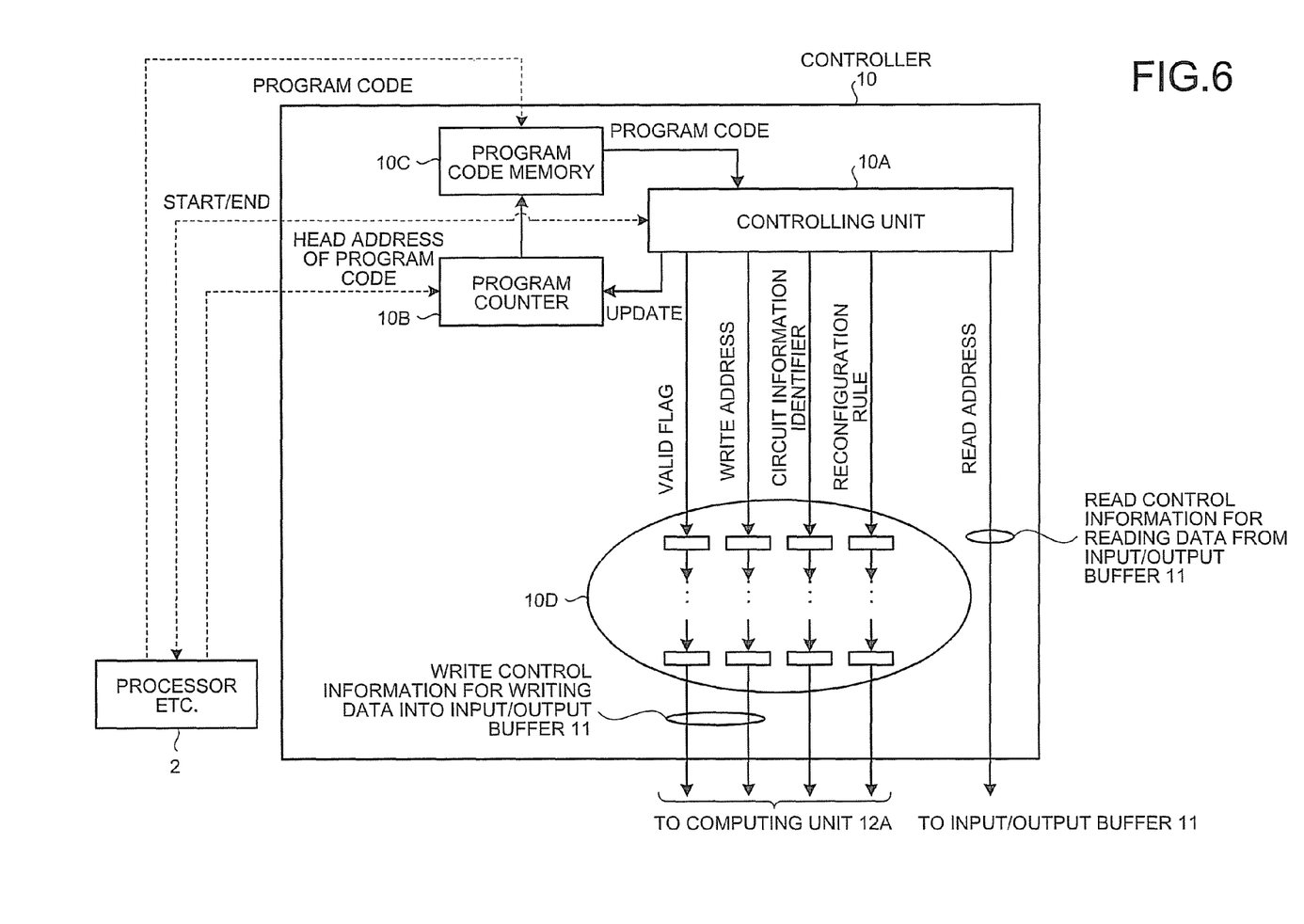
FIG. 6 is a block diagram for showing the structure of a controller.

The data processing conducted by the controller 10 is explained in detail below. As illustrated in FIG. 6, the controller 10 includes a controlling unit 10A, a program counter 10B, the program code memory 10C, and a timing latch 10D.

The controlling unit 10A reads a program code from the program code memory 10C by using the value of the program counter 10B as the target address. Based on the read-out program code, the controlling unit 10A outputs the control information (the write control information and the read control information) that is used to control the access to the input/output buffer 11 and the reconfiguration information (the circuit information identifier and the reconfiguration rule). The controlling unit 10A is connected to the program counter 10B and the program code memory 10C.

The control information for controlling the operation of reading data (read control information) from the input/output buffer 11 to the computing unit 12A is sent to the input/output buffer 11. The timing at which the control information for controlling the operation of writing data (write control information) to the input/output buffer 11 and the reconfiguration information (the circuit information identifier and the reconfiguration rule) arrives at the computing unit 12A is adjusted by the timing latch 10D before the information is sent to the computing unit 12A, in such a manner that the arrival coincides with the cycle in which the data read from the input/output buffer 11 arrives at the computing unit 12A.

A program code is written in the program code memory 10C by the external device 2 before the data processing starts. The value of the program counter 10B is updated to the head address of the program code by the external device 2.

Figure 7:
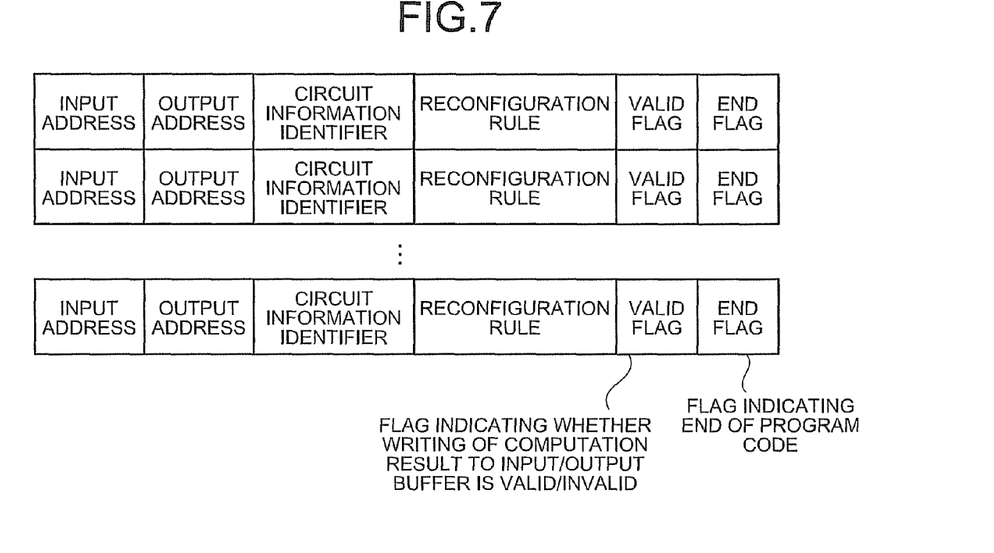
FIG. 7 is a diagram for showing an exemplary structure of program codes stored in a program code memory.

In FIG. 7, the program code includes an input address that indicates the address of the input/output buffer 11 from which the data should be read, an output address that indicates the address of the input/output buffer 11 to which the data should be written, the circuit information identifier, the reconfiguration rule, a valid flag, and an end flag. The input address is the read control information, and the output address and the valid flag are the write control information.

The program code is interpreted one address in a cycle. The program counter 10B is incremented by one every time the interpretation is completed for one address. The input address is transferred to the input/output buffer 11. The output address, the circuit information identifier, the reconfiguration rule, and the valid flag are transferred to the computing units 12A to 12E in a pipelined manner. Finally, the output address and the valid flag are transferred from the computing unit 12E to the input/output buffer 11 together with the computation result (data). The valid flag indicates whether the operation of writing data into the input/output buffer 11 is valid. When it is invalid, the computation result obtained by the computing unit 12E is not written into the input/output buffer 11.

The end flag marks the end of the program code. The controlling unit 10A notifies the external device 2 of the completion of the data processing when the interpretation of the end address of the program code is completed. The controlling unit 10A keeps outputting a valid flag that indicates the invalidity of the operation of writing data into the input/output buffer 11, until it receives a notification of the start of new data processing from the external device 2.

The operation in which the semiconductor device 1 executes a computation on the input data by changing the circuit structure of the processing unit 120 in accordance with the reconfiguration information (the circuit information identifier and the reconfiguration rule) received by the computing units 12 is explained below. For the sake of convenience, it is assumed in FIG. 8 that the controller 10 starts the interpretation of the program code in cycle 1, and that the interpreted reconfiguration information (the circuit information identifier and the reconfiguration rule) arrives at the computing unit 12A in the cycle in which the controller 10 interprets the reconfiguration information (the circuit information identifier and the reconfiguration rule).

Figure 9:
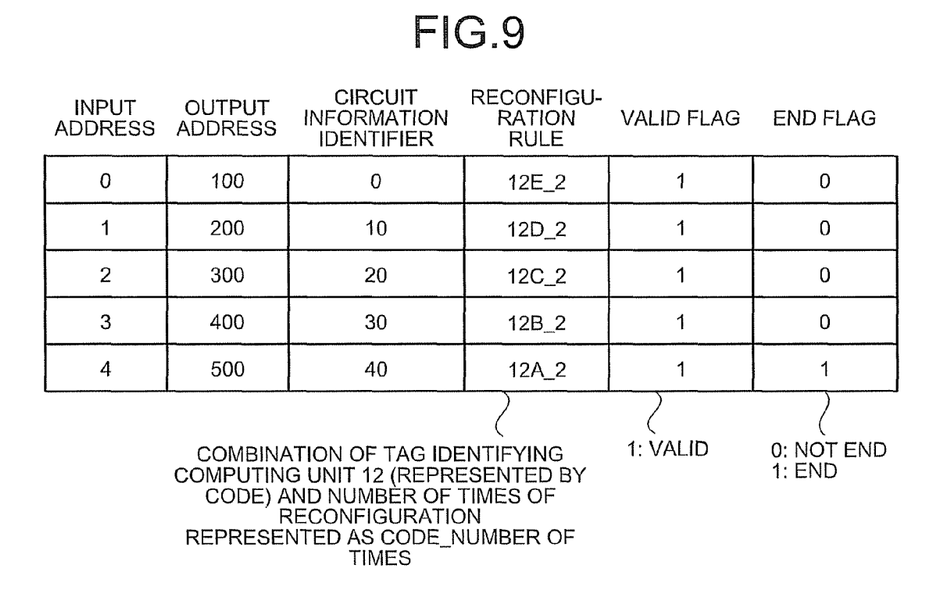
FIG. 9 is a diagram for showing program codes interpreted by the controller in the data processing performed according to the present embodiment.

In FIG. 9, it is assumed that the reconfiguration rule is a combination of a tag that identifies one of the computing units 12A to 12E and the number of times the reconfiguration is performed. This program executes six computations sequentially onto the data that is read from the input/output buffer 11 in five consecutive cycles, and writes the resultant data into the input/output buffer 11 in five consecutive cycles, processing in ten cycles in total.

Figure 8:
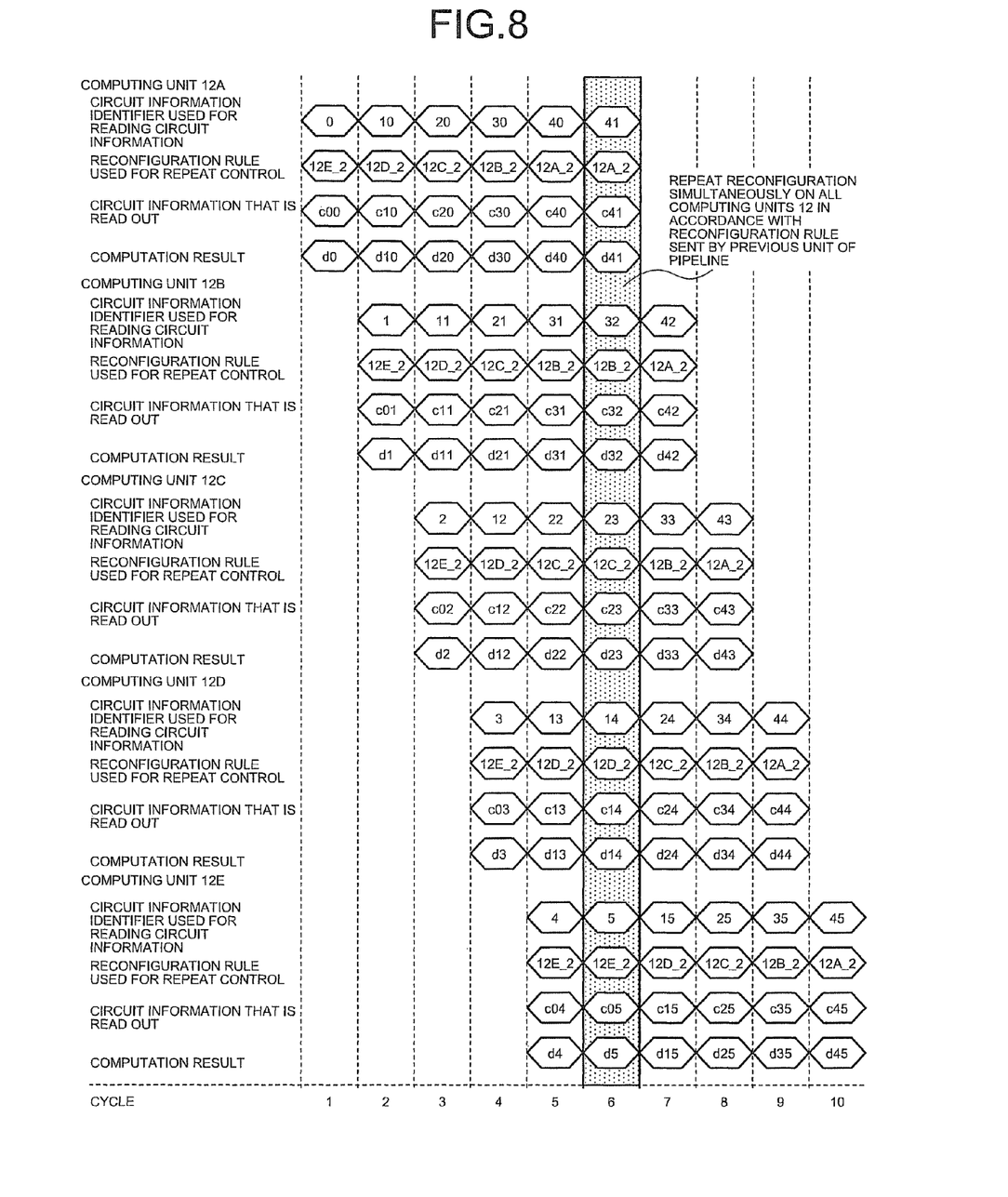
FIG. 8 is a diagram for explaining the computing operation performed by the semiconductor device.

In cycle 1, the computing unit 12A receives the reconfiguration information (a circuit information identifier "0" and a reconfiguration rule "12E_2"), reads circuit information "c00" from the circuit information storage unit 121, and changes the circuit structure of the processing unit 120. Then, the computing unit 12A executes a computation on the data read from an (input) address "0" of the input/output buffer 11, and outputs a computation result "d0". The computing unit 12A also outputs the reconfiguration information (the circuit information identifier updated to "1" and the reconfiguration rule "12E_2"). The reconfiguration rule "12E_2" denotes the identification tag indicating the computing unit 12E and the number of times indicating "2".

In cycle 1, the computing units 12B to 12E perform computations in accordance with the input circuit information identifier and data. The final computation result output from the computing unit 12E based on the computation result obtained by each of the computing units 12 is not written into the input/output buffer 11, and therefore this computing unit can be regarded as not performing any computation. Hereinafter, the operation of the computing unit 12 that can be regarded as not performing any computing operation in the following cycles is omitted from the discussion.

In cycle 2, the computing unit 12A receives the reconfiguration information (a circuit information identifier "10" and a reconfiguration rule "12D_2"), reads circuit information "c10" from the circuit information storage unit 121, and changes the circuit structure of the processing unit 120. Then, the computing unit 12A performs a computation on the data read from an (input) address "1" of the input/output buffer 11, and outputs a computation result "d10". The computing unit 12A also outputs the reconfiguration information (the circuit information identifier updated to "11" and the reconfiguration rule "12D_2"). The reconfiguration rule "12D_2" denotes the identification tag being the computing unit 12D and the number of times being "2".

In cycle 2, the computing unit 12B receives the reconfiguration information (the circuit information identifier "1" and the reconfiguration rule "12E_2"), reads the circuit information "c01" from the circuit information storage unit 121, and changes the circuit structure of the processing unit 120. Then, the computing unit 12B performs a computation on the data "d0" received from the computing unit 12A, and outputs a computation result "d1". Further, the computing unit 12B outputs the reconfiguration information (the circuit information identifier updated to "2" and the reconfiguration rule "12E_2").

In the same manner as the above, up to cycle 5, the computing unit 12A reads the circuit information from the circuit information storage unit 121 in accordance with the circuit information identifier of the reconfiguration information transferred from the controller 10, thereby changes the circuit structure of the processing unit 120, and performs a computation on the data received from the input/output buffer 11 to output the calculation result (data). The computing unit 12A also updates the circuit information identifier received from the controller 10 by incrementing it by 1, and outputs the updated circuit information identifier and the reconfiguration rule received from the controller 10 as the reconfiguration information. The computing units 12B to 12E process the data and the reconfiguration information (the circuit information identifier and the reconfiguration rule) transferred from the previous one of the computing units 12A to 12D, in the same manner as the computing unit 12A.

In cycle 6, the computing units 12A to 12E read the corresponding one of the circuit information "c41", "c32", "c23", "c14", and "c05" from the circuit information storage unit 121 in accordance with the corresponding one of the circuit information identifiers "41", "32", "23", "14", and "5" of the reconfiguration information output in the previous cycle, and updates the circuit structure of the processing unit 120. Then, each of the computing units 12A to 12E performs a computation on the computation result "d40", "d31", "d22", "d13", or "d4" output by itself in the previous cycle, and outputs the new computation result "d41", "d32", "d23", "d14", or "d5". Furthermore, each of the computing units 12A to 12E outputs the reconfiguration information (the circuit information identifier "42", "33", "24", "15", or "6", and the reconfiguration rule "12A_2", "12B_2", "12C_2", "12D_2", or "12E_2"). The computing unit 12E outputs only the computation result "d5" to the (output) address 100 of the input/output buffer 11, but does not output the reconfiguration information (the circuit information identifier "6" and the reconfiguration rule "12E_2") to the (output) address 100.

The operation in cycle 6 differs from any of the operations in cycles 1 through 5 because, according to the reconfiguration rule of the reconfiguration information received by the computing units 12A to 12E in cycle 5, the tag indicates the corresponding one of the computing units 12A to 12E, and the number of times indicates "2", which means that all the repetition controlling units 126 of the computing units 12A to 12E shift from the initial state S1 to the state S2 in cycle 6.

In cycle 7, because all the repetition controlling units 126 of the computing units 12A to 12E are shifted from the state S2 to the initial state S1, the computing units 12A to 12E perform the same operations as in cycles 1 through 5. Because the controller 10 has already completed the interpretation of the program code, the computing unit 12A can be regarded as not performing any computation.

Thereafter, in the same manner as in cycle 7, the computing units 12C to 12E perform the operations in cycle 8, the computing units 12D and 12E perform the operations in cycle 9, and the computing unit 12E performs the operation in cycle 10. All the computation operations are completed in cycle 10.

According to the above embodiment, reconfigurable circuits that are connected in the form of a pipeline can be individually controlled to repeat computing operations by using as input data the computation results obtained in the previous cycle.

With such a semiconductor device, the computing units 12A to 12E repeat the computation in the same cycle, based on the computation results obtained in the previous cycle in accordance with the reconfiguration rule provided by the controller 10, as in the operations of the computing units 12A to 12E illustrated in FIG. 8. Thus, even if the number of computing operations from the data reading from the input/output buffer 11 to the data writing into the input/output buffer 11 is greater than the number of computing units 12, the process can be realized with the minimum non-operating period in the computing units 12.

In the semiconductor device according to the present embodiment, when each of the computing units completes the computation for the designated number of times, the computation result data and the updated reconfiguration information are input to the following computing unit. When the computation are not yet performed for the designated number of times, the computation result data and the updated reconfiguration information are input to the computing unit of its own, and the computing unit repeats the computation based on the updated reconfiguration information. Hence, the semiconductor device can control the computing units connected in the form of a pipeline to repeat computations by using the result obtained in the previous cycle as input data. Even when the number of computing operations that are to be sequentially executed on the data is greater than the number of computing units, the period of time in which the computing units do not execute any computation on the data can be minimized.

The present invention is advantageous because, even when the number of computing operations larger than the number of dynamically reconfigurable circuits are to be sequentially executed, the period of time in which none of the reconfigurable circuits performs the computing operation on the data can be minimized.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor device comprising:
   a controller; and
   a plurality of dynamically reconfigurable circuits connected to one another in series below the controller to perform operations in a manner of a pipeline, wherein
   (A) the controller inputs to a first one of the dynamically reconfigurable circuits:
   data that is to be processed, and
   reconfiguration information including identification information that identifies an item of circuit information used to constitute an execution circuit necessary for a computation executed on the data in the dynamically reconfigurable circuits, from among a plurality of items of circuit information held individually by the dynamically reconfigurable circuits, and information that indicates a number of times the computation is to be executed individually by the dynamically reconfigurable circuits, and
   (B) each of the dynamically reconfigurable circuits includes
       (a) a processing unit that, each time the reconfiguration information is input, is constituted by an execution circuit changed in accordance with the circuit information identified by the reconfiguration information that is input and that processes the data that is input by one of the controller, a previous one of the dynamically reconfigurable circuits, and the same one of the dynamically reconfigurable circuits,
       (b) an updating unit that, each time the reconfiguration information is input, updates identification information included in the reconfiguration information that is input to identification information that identifies the circuit information necessary for a computation that is to be subsequently executed on the processed data, and
       (c) a repetition controlling unit that determines whether the processing unit is to perform a repeat operation, wherein the repeat operation performs a control so that the processed data and new reconfiguration information that includes the identification information that is updated by the updating unit are input to a subsequent one of the dynamically reconfigurable circuits when the repetition controlling unit determines that the processing unit has completed the computation for the number of times included in the reconfiguration information that is input and that performs a control so that the processed data and the new reconfiguration information that includes the identification information that is updated by the updating unit are input to the same one of the dynamically reconfigurable circuits without being input to the subsequent one of the dynamically reconfigurable circuits when the repetition controlling unit determines that the processing unit has not yet completed the computation for the number of times included in the reconfiguration information that is input.

2. The device according to claim 1, wherein a total number of times of computation is greater than the number of dynamically reconfigurable circuits.

3. The device according to claim 1, wherein
   each of the dynamically reconfigurable circuits further includes a storage unit that stores the circuit information,
   the reconfiguration information includes
       an address that indicates where in the storage unit the circuit information is stored, and
       a reconfiguration rule that determines the number of times the computation is performed by each of the dynamically reconfigurable circuits,
   the processing unit is constituted by the execution circuit identified by the circuit information read from a position of the storage unit indicated by the address, and thereby processes the data, and
   the updating unit updates the address that is input to an address at which the circuit information necessary for a next computation is stored.

4. The device according to claim 3, wherein the updating unit updates the address by incrementing the address by one, and the incremented address represents the address at which the circuit information necessary for the next computation is stored.

5. The device according to claim 3, wherein
the reconfiguration rule includes
- an identifier that uniquely identifies each of the dynamically reconfigurable circuits, and
- a first number of times the computation is performed, the processing unit of one of the dynamically reconfigurable circuits that is identified by the identifier performs the computation for the first number of times, and processing units of other ones of the dynamically reconfigurable circuits that are not identified by the identifier perform the computation for a predetermined second number of times.

6. The device according to claim 4, wherein
the reconfiguration rule includes
- an identifier that uniquely identifies each of the dynamically reconfigurable circuits, and
- a first number of times the computation is performed, the processing unit of one of the dynamically reconfigurable circuits that is identified by the identifier performs the computation for the first number of times, and processing units of other ones of the dynamically reconfigurable circuits that are not identified by the identifier perform the computation for a predetermined second number of times.

7. The device according to claim 3, wherein
the reconfiguration rule includes
- an identifier that uniquely identifies each of the dynamically reconfigurable circuits, and
- a final circuit information identifier that identifies circuit information that is used to construct an execution circuit required for a last computation performed by one of the dynamically reconfigurable circuits identified by the identifier, the processing unit of one of the dynamically reconfigurable circuits identified by the identifier performs the computation until the circuit information identifier input or updated agrees with the final circuit information identifier, and processing units of other ones of the dynamically reconfigurable circuits that are not identified by the identifier perform the computation for a predetermined number of times.

8. The device according to claim 4, wherein
the reconfiguration rule includes
- an identifier that uniquely identifies each of the dynamically reconfigurable circuits, and
- a final circuit information identifier that identifies circuit information that is used to construct an execution circuit required for a last computation performed by one of the dynamically reconfigurable circuits identified by the identifier, the processing unit of one of the dynamically reconfigurable circuits identified by the identifier performs the computation until the circuit information identifier input or updated agrees with the final circuit information identifier, and processing units of other ones of the dynamically reconfigurable circuits that are not identified by the identifier perform the computation for a predetermined number of times.

9. A data processing method performed by a semiconductor device that includes a controller and a plurality of dynamically reconfigurable circuits connected to one another in series below the controller to perform operations in a manner of a pipeline, the method comprising:

inputting, by the controller to a first one of the dynamically reconfigurable circuits, data that is to be processed, and reconfiguration information including identification information that identifies an item of circuit information used to constitute an execution circuit necessary for a computation executed on the data in the dynamically reconfigurable circuits, and information indicative of a number of times that the computation is to be executed individually by the dynamically reconfigurable circuits;

each time the reconfiguration information is input, processing, by each of the dynamically reconfigurable circuits, the data that is constituted by an execution circuit changed in accordance with the circuit information identified by the reconfiguration information that is input, the data being input by one of the controller, previous one of the dynamically reconfigurable circuits, and the same one of the dynamically reconfiqurable circuits;

each time the reconfiguration information is input, updating, by each of the dynamically reconfigurable circuits, identification information included in the reconfiguration information that is input to identification information that identifies the circuit information necessary for a computation that is to be subsequently executed on the processed data; and determining, by each of the dynamically reconfigurable circuits, whether the processing is to perform a repeat operation, wherein the repeat operation comprises performing a control so that the processed data and new reconfiguration information that includes the identification information that is updated are input to a subsequent one of the dynamically reconfigurable circuits when the controlling determines that the processing has completed the computation for the number of times included in the reconfiguration information that is input, and performing a control so that the processed data and the new reconfiguration information that includes the identification information that is updated are input to the same one of the dynamically reconfigurable circuits without being input to the subsequent one of the dynamically reconfigurable circuits when the controlling determines that the processing has not yet completed the computation for the number of times included in the reconfiguration information that is input.

* * * * *